Aug. 16, 1932. J. O. TURNER 1,871,482
CRATE FASTENER
Filed April 14, 1930 2 Sheets-Sheet 1
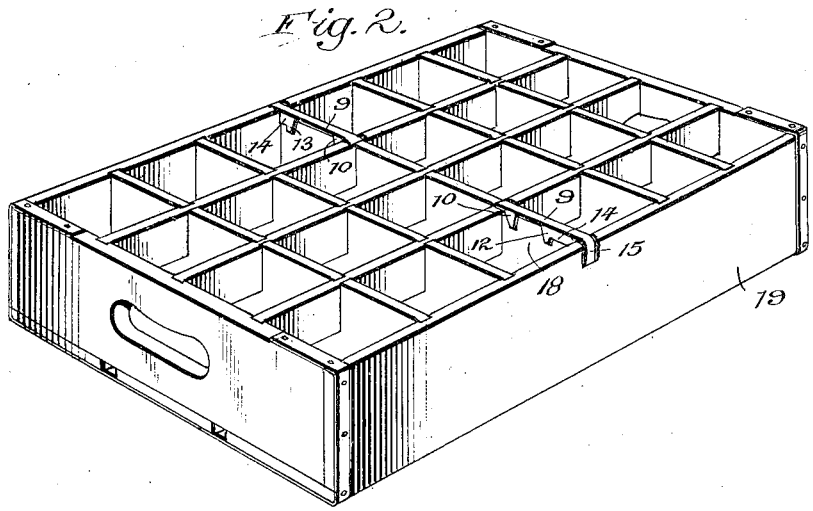
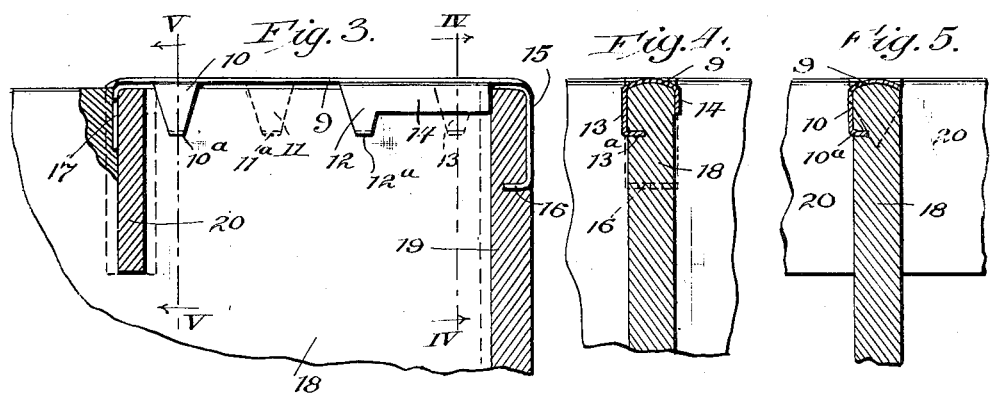
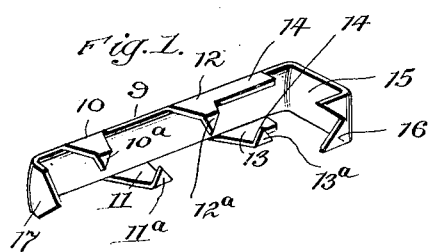
Inventor
Joseph O. Turner Aug. 16, 1932.  J. O. TURNER  1,871,482
CRATE FASTENER
Filed April 14, 1930   2 Sheets-Sheet 2
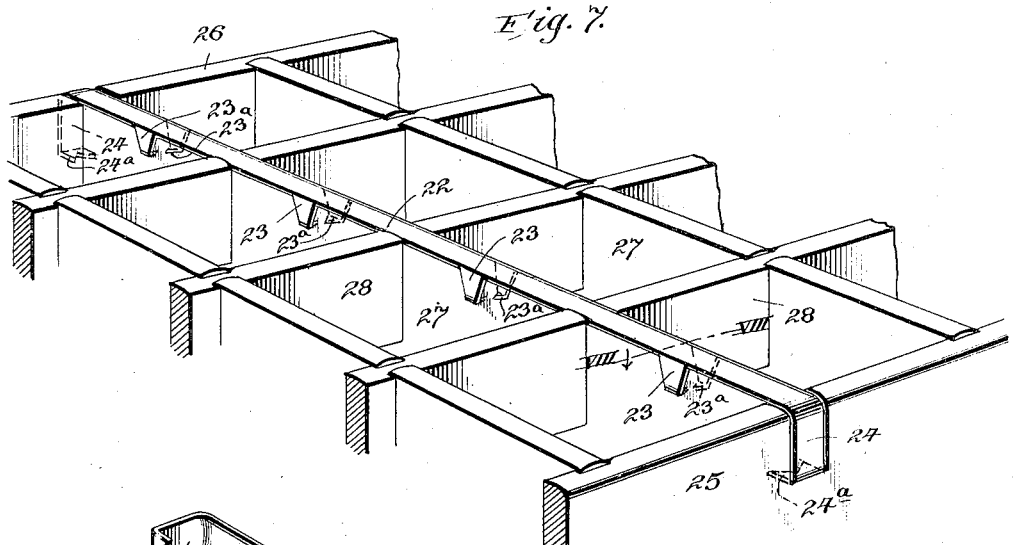
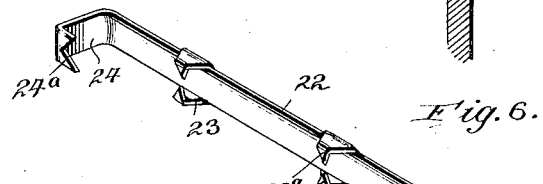
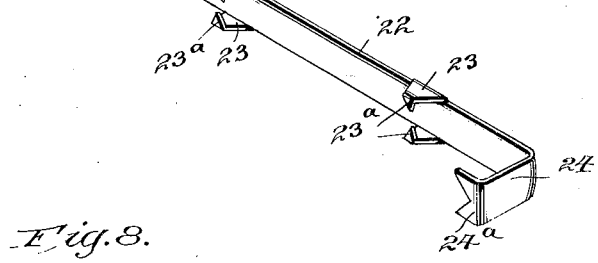
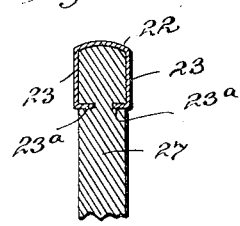
Inventor
Joseph O. Turner Patented Aug. 16, 1932

1,871,482

UNITED STATES PATENT OFFICE

JOSEPH O. TURNER, OF WINSTON-SALEM, NORTH CAROLINA, ASSIGNOR TO THE MENGEL COMPANY, OF LOUISVILLE, KENTUCKY

CRATE FASTENER

Application filed April 14, 1930. Serial No. 444,309.

My invention relates to improvements in crates, and particularly to a fastener for securing the partitions or rack-strips to the sides of a crate.

The purpose of this invention is to provide an improved form of fastener which is constructed to clamp over two parallel crate elements, such as a side wall and a partition, or two partitions or over both side walls so as to prevent the parts from bulging. Crates of this character are ordinarily employed for holding bottles, and are frequently subjected to very severe strains which necessitate all the parts being held in rigid relation one to another. Failure in crates of this type frequently occurs due to the separation of one of the side walls of the crate from the abutting partitions or rack-strips when, for example, the crate is picked up by one side so as to subject the side walls to unusual strain.

I will describe two forms of crate fastener embodying my invention and then point out the novel features thereof in the claims.

In the accompanying drawings:

Figure 1 is a perspective view of one form of fastener embodying my invention,

Fig. 2 is a perspective view of a bottle crate showing this fastener in place,

Fig. 3 is a vertical sectional view through the crate, showing the parts of the fastener in elevation, Fig. 4 is a section on line IV—IV of Fig. 3, Fig. 5 is a sectional view on line V—V of Fig. 3, Fig. 6 is a perspective view of a modified form of fastener, Fig. 7 is a perspective fragmentary view showing the modified form of fastener in position on a crate, and Fig. 8 is a section on line VIII—VIII of Fig. 7.

The fastener shown in Fig. 1 comprises a long narrow body 9 having depending tongues 10 and 12 on one side, and 11 and 13 on the other side. Each of the tongues 10, 11, 12, and 13 carries integral bent-over prongs 10a, 11a, 12a, and 13a, adapted to contact with, and be driven into, the sides of a crate element. The two tongues 12 and 13 also have integral extensions 14 which are bent down parallel to these tongues, and are adapted to embrace the sides of the crate partition, as clearly shown in Figs. 2 to 5.

In addition to the tongues just mentioned, the fastener has depending portions 15 and 17 on the two ends thereof, the portion 15 having horizontally extended prongs 16 which are adapted to be driven into the side wall of the crate. In this embodiment of my invention the various depending tongues are placed in staggered relation so that when driven into a crate element, the possibility of splitting this element will be minimized.

The function of this fastener, and the manner in which this function is carried out, will be clear from an examination of Figs. 2 to 5 inclusive. Referring now to Fig. 3, it will be noted that the narrow body 9 of the fastener rests upon the top surface of a crate partition 18, that the lateral tongues 10 to 13 depend downwardly, and that the prongs carried by these tongues are driven into the sides of the partition 18, as shown in Figs. 4 and 5. The depending portion 15 is bent over the side wall 19 of the crate, and the prongs 16 are driven into this wall so that the fastener fits smoothly on the top of partition 18 over the top of wall 19, and the lateral side of this wall. The depending portion 17 of the fastener is driven in between a longitudinal partition 20 of the crate, and the associated partition 18.

In Fig. 1, the depending tongues are shown as bent into the positions which they occupy when the fastener is secured to a crate, but it will be obvious that before the fastener is set in place, the tongues 10 to 13 and portion 15 must be bent outwardly far enough to permit the fastener to be set in place without the prongs contacting with the crate partition. Likewise, the depending portion 15 must be bent outwardly prior to setting the fastener in place. With these parts bent outwardly as indicated, the fastener is secured to the crate by driving the portion 17 down between partition 20 and partition 18, as shown in Fig. 3, so that depending portion 15 extends along the outer face of wall 19, and the tongues 10 to 13 likewise extend downwardly along the sides of partition 18. Portion 15 is then driven inwardly toward the portion 17 until the prongs 16 are firmly set in the wall 19, as shown in Fig. 3. The tongues 10 to 13 are then bent inwardly until all of the associated prongs 10a, 11a, etc. bite into the sides of partition 18 in a corresponding manner. When the tongues 12 and 13 are bent inwardly the associated extensions 14 are also bent into close engagement with the sides of partition 18 so that the fastener, and all of its associated parts, contact closely with both the sides and the top of the crate partition 18 and leave no projecting corners at any point.

Crates of this character frequently break or are damaged by the side walls separating from the partitions, particularly near the center, and for this reason it is very advantageous to secure the outer walls of the crate to the first parallel partition. With this construction, the side walls cannot bulge outwardly at the center because they are rigidly connected to a longitudinal rack-strip or partition within the crate, and any lateral thrust is taken up by the fastener in its connection with the partition, on top of which it is placed.

Under some conditions it may be advisable to extend the fastener entirely across the top of the crate in order to securely bind together the two outer walls of the crate by a single fastening member. When such a construction is desired, I may employ the type of fastener shown in Fig. 6. Referring to this figure, the fastener there shown comprises a long narrow body portion 22 having depending lateral tongues 23, each of which carries a sharp securing prong 23a. The fastener 22 likewise has portions 24 depending from each end thereof and carrying integral prongs 24a.

The manner of securing this fastener in place is clearly indicated in Fig. 7. The reference characters 25 and 26 designate the longitudinal side walls of the crate, having associated with them, longitudinal rack-strips or partitions 28 and cross partitions or rack-strips 27. These various strips or partitions are notched together in the usual manner. The fastener 22 is placed on top of a cross strip 27 and tongues 23 bent downwardly until the prongs 23a bite into the sides of the partition, and the tongues 23 contact closely with the sides of this partition. The depending portions 24 are then also bent downwardly and inwardly so that the prongs 24a bite into the side walls 25 and 26 of the crate and securely lock these side walls to the partition 27. As ordinarily constructed, the top faces of the rack-strips or partitions are of slightly rounded contour and it is preferable to make the longitudinal body of the fastener of similar contour so as to contact with the partition, as shown in Fig. 8, without leaving any projecting edges.

It will be evident that with this construction, the parts of the crate are securely bound together so that there is slight possibility of side walls 25 and 26 moving outwardly from the center of the crate. Likewise, the rack-strips are secured in firm position relatively to these walls, so that the parts cannot fall out if the partitions dry out and produce slight separation between the various mortise and tenon joints. In this embodiment of the invention I have shown the lateral depending tongues 23 as being placed in line with each other on opposite sides of the fastener, but it may be found preferable to stagger them in the manner shown in Fig. 1. The construction shown in Fig. 1 is adapted for use with thin rack-strips or partitions where there is a possibility of their splitting when the prongs are set in place. With thick partitions, either arrangement shown in entirely satisfactory.

I have shown both embodiments of my invention as applied to a crate in which the partitions are secured in place by mortise and tenon joints, but the fastener may be used equally well where the members to be braced are merely placed in abutting relation. In fact, with the device as shown in Fig. 6, the use of mortise and tenon joints may be superfluous since the fastener itself will securely hold the partitions in place within the crate, without any other fastening means being provided.

The fastener shown is simple and cheap to manufacture, and when in place leaves no metallic projections. It is well adapted to withstand the usage to which bottle crates are usually subjected, and may be secured in place by hand or a suitable machine may be provided for this purpose.

Although I have herein shown and described only two forms of fastener embodying my invention it will be obvious that various changes and modifications may be made in the details thereof, within the scope of the appended claims, without departing from the spirit and scope of my invention.

What is claimed is:

1. A crate fastener comprising a long narrow straight deformable metal body; a plurality of tongues depending from the opposite sides of said body; a tongue depending from one end of said body in alignment with said body and designed to overlie and engage a crate partition; and a second tongue depending from the other end of said body and having a plurality of projecting prongs.

2. A crate fastener comprising a narrow elongated malleable metal body; a plurality of clamping tongues depending laterally from opposite sides of said body; a straight portion depending from and in alignment with one end of said body and adapted to fit between two abutting crate elements; and a second portion depending from and in alignment with the other end of said body, and having projecting prongs thereon, adapted to engage the side of a crate element.

In testimony whereof I have signed my name to this specification.

JOSEPH O. TURNER.